US006578106B1

(12) United States Patent
Price (10) Patent No.: US 6,578,106 B1
(45) Date of Patent: Jun. 10, 2003

(54) DATA STORAGE SYSTEM ADAPTED TO SELECT AN OPERATIONAL STATE WITH CORRESPONDING PERFORMANCE LEVELS AND ACOUSTIC NOISE LEVELS BASED ON A SYSTEM PROFILE

(75) Inventor: William P. Price, Fountain Valley, CA (US)

(73) Assignees: Keen Personal Media, Inc., Lake Forest, CA (US); Keen Personal Technologies, Inc., Lake Forest, CA (US)

( * ) Notice: Subject to any disclaimer, the term of this patent is extended or adjusted under 35 U.S.C. 154(b) by 385 days.

(21) Appl. No.: 09/704,198

(22) Filed: Oct. 31, 2000

(51) Int. Cl.$^7$ ................................................. G06F 12/00
(52) U.S. Cl. ...................... 711/111; 711/156; 360/78.06; 360/78.07; 360/78.09; 360/69
(58) Field of Search ................................. 711/111, 156; 360/78.06, 78.07, 78.09, 69

(56) References Cited

U.S. PATENT DOCUMENTS

| | | | | |
|---|---|---|---|---|
| 4,916,635 A | * | 4/1990 | Singer et al. ................ 700/254 |
| 5,465,034 A | * | 11/1995 | Andrews et al. ............. 318/560 |
| 5,638,267 A | * | 6/1997 | Singhose et al. .............. 700/28 |
| 5,657,179 A | | 8/1997 | McKenzie ................ 360/78.06 |
| 5,668,680 A | * | 9/1997 | Tremaine ................. 360/78.07 |
| 5,696,647 A | * | 12/1997 | Phan et al. ............... 360/78.07 |
| 5,760,992 A | | 6/1998 | Phan et al. ............... 360/78.07 |
| 5,901,009 A | * | 5/1999 | Sri-Jayantha et al. .... 360/78.07 |
| 6,310,743 B1 | * | 10/2001 | Haines et al. ............. 360/78.07 |
| 6,314,473 B1 | | 11/2001 | Singer et al. .................... 710/5 |
| 6,396,653 B1 | * | 5/2002 | Haines et al. ................... 360/75 |
| 6,441,988 B2 | * | 8/2002 | Kang et al. ............... 360/78.06 |
| 6,456,996 B1 | * | 9/2002 | Crawford et al. ............... 707/1 |
| 6,493,169 B1 | * | 12/2002 | Ferris et al. .............. 360/73.03 |
| 6,501,613 B1 | * | 12/2002 | Shih ......................... 360/78.06 |

FOREIGN PATENT DOCUMENTS

| | | | |
|---|---|---|---|
| EP | 0441407 A1 * | 8/1991 | ............ G11B/5/55 |
| WO | WO99/45535 | 9/2000 | ............ G11B/5/55 |

OTHER PUBLICATIONS

Fahimi et al., "Mitigation of Acoustic noise and Vibration in Switched Reluctance Motor Drive Using Neural Network Based Current Profiling," pp 715–722, IEEE, 1998.*

Fahimi et al., "Spatial Distribution of Acoustic Noise Caused by Radial Vibration in Switched Reluctance Motors: Application to Design and Control," pp 114–117, IEEE, 6–2000.*

Andrade et al., "A Study of a Soft Switched Bang–Bang Current Controlled Inverter," pp 1266–1271, IEEE, 1999.*

* cited by examiner

*Primary Examiner*—Matthew Kim
*Assistant Examiner*—Stephen Elmore
(74) *Attorney, Agent, or Firm*—Milad G. Shara, Esq.; Knobbe Martens Olson & Bear LLP (57) ABSTRACT

The present invention may be regarded as a data storage system and a method of controlling the acoustic noise generated by a storage drive of a data storage system. The data storage system includes a storage drive adapted to operate in a selected operational state of a plurality of operational states. Each operational state generates a corresponding acoustic noise level and operates at a corresponding performance level. The data storage system further includes a system controller coupled to the storage drive, the system controller including a system profile. The system controller is adapted to: (a) receive at least one variable parameter; (b) use the at least one variable parameter as an index to the system profile to autonomously select one of the plurality of operational states as the selected operational state; and (c) transmit a control signal to the storage drive. The control signal corresponds to the selected operational state and causes the storage drive to enter the selected operational state, thereby controlling the acoustic noise and the performance level of the storage drive in response to the at least one variable parameter.

50 Claims, 4 Drawing Sheets

DATA STORAGE SYSTEM ADAPTED TO SELECT AN OPERATIONAL STATE WITH CORRESPONDING PERFORMANCE LEVELS AND ACOUSTIC NOISE LEVELS BASED ON A SYSTEM PROFILE

BACKGROUND OF THE INVENTION

1. Field of the Invention

The present invention is directed to data storage systems which generate acoustic noise during operation, and more specifically, to data storage systems adapted to select an appropriate operational state to control the acoustic noise.

2. Description of the Related Art

Hard disk drives (HDDs) are currently used as data storage devices primarily for personal computers and can be found in households and business offices. HDDs are also becoming more prevalent in other consumer electronic devices found in the home or office, such as set-top boxes, digital video recorders, digital audio recorders, home network servers, and business network servers.

However, HDDs suffer from high levels of acoustic noise generated from the operation of the HDDs. This acoustic noise is created by the rapid acceleration and movement of the internal actuator mechanism which moves the read/write head assembly about the surface of the recording media (i.e., the disk) as data is accessed. As consumer devices containing HDDs become more commonplace in quiet environments such as business offices, living rooms, bedrooms, and home entertainment centers, the frequency of consumer complaints concerning the level of acoustic noise generated by these devices is expected to increase.

The acoustic noise generated by a HDD can be reduced by slowing the movement of the read/write head across the disk surface (i.e., increasing the seek time), as disclosed by Singer, et al., in International Publication No. WO 99/45535. However, increasing the seek time also reduces the bandwidth of HDD data access, thereby resulting in a degradation of the performance of the HDD. In addition, other efforts have previously been made to reduce the magnitude of the acoustic noise generated by the operation of HDDs by shaping the inputs in order to minimize unwanted dynamics (see, e.g., Singer, et al., U.S. Pat. No. 4,916,635, and Singhose, et al., U.S. Pat. No. 5,638,267).

In the system disclosed by Singer, et al., in WO 99/45535, a graphical user interface (GUI) including a controller is presented to the user of a system utilizing a HDD. In one embodiment, the controller is in the form of a sliding scale by which the user can select one operating state of the system along a continuum between a relatively high acoustic noise level/short seek time and a relatively low acoustic noise level/long seek time. To change the operational state of the system, the user is required to access the controller of the GUI and update the selected operational state. In an alternative embodiment, the controller presents the operating states to be chosen in the form of discrete numbered operating states of the system. In either case, because the acoustic noise level and the seek time vary inversely to one another, the user-selected operational state represents a trade-off between the generated acoustic noise and the performance of the HDD.

SUMMARY OF THE INVENTION

The present invention may be regarded as a data storage system comprising a storage drive adapted to operate in a selected operational state of a plurality of operational states. Each operational state generates a corresponding acoustic noise level and operates at a corresponding performance level. The data storage system further comprises a system controller coupled to the storage drive, the system controller including a system profile. The system controller is adapted to: (a) receive at least one variable parameter; (b) use the at least one variable parameter as an index to the system profile to autonomously select one of the plurality of operational states as the selected operational state; and (c) transmit a control signal to the storage drive. The control signal corresponds to the selected operational state and causes the storage drive to enter the selected operational state, thereby controlling the acoustic noise and the performance level of the storage drive in response to the at least one variable parameter.

The present invention may also be regarded as a method of controlling the acoustic noise generated by a storage drive of a data storage system. The storage drive is adapted to operate in a selected operational state of a plurality of operational states. Each operational state generates a corresponding acoustic noise level and operates at a corresponding performance level. The method comprises defining a system profile, the system profile relating the plurality of operational states of the storage device to at least one variable parameter. The method further comprises receiving at least one variable parameter and applying the at least one variable parameter to the system profile. The method further comprises selecting the selected operational state from the plurality of operational states in response to the at least one variable parameter. The method further comprises transmitting a control signal to the storage drive, the control signal corresponding to the selected operational state, thereby controlling the acoustic noise and performance level of the storage drive in response to the at least one variable parameter.

DETAILED DESCRIPTION OF THE PREFERRED EMBODIMENT

Figure 1:
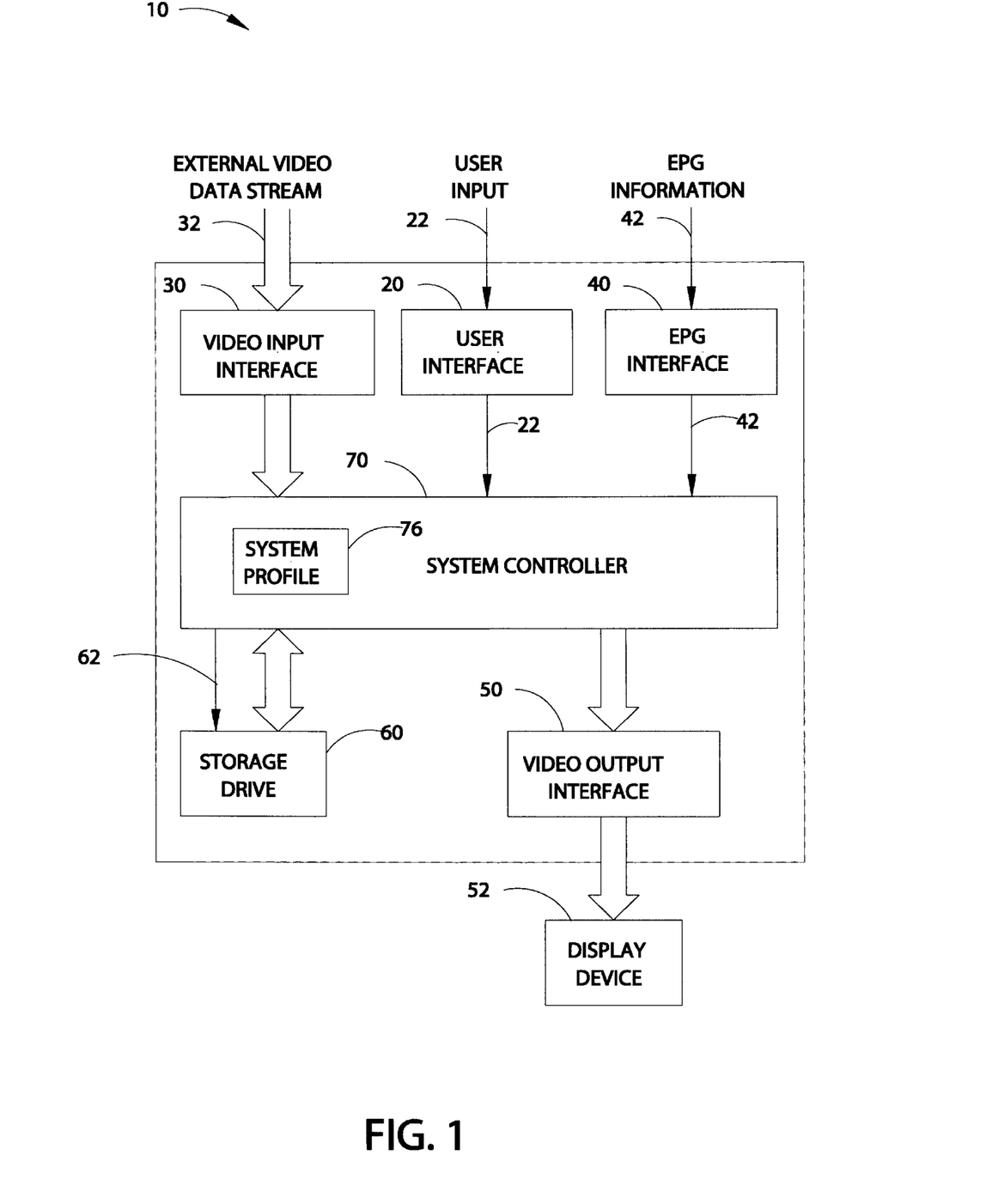
FIG. 1 schematically illustrates a video data storage system in accordance with an embodiment of the present invention.

FIG. 1 schematically illustrates a video data storage system 10 in accordance with an embodiment of the present invention. The video data storage system 10 comprises a user interface 20 that receives user input 22, a video input interface 30 that receives an external video data stream 32 for a selected video program segment, an electronic program guide ("EPG") interface 40 that receives EPG information 42, a video output interface 50 that is connectable to a display device 52, a storage drive 60 responsive to a set of control signals 62, and a system controller 70 which comprises a system profile 76. The system controller 70 is coupled to the user interface 20, video input interface 30, EPG interface 40, video output interface 50, and storage drive 60.

By receiving user input 22, the user interface 20 permits the user to indicate to the video data storage system 10 which video program segments are selected for recording from the external video data stream 32, as well as to control various other operation parameters of the video data storage system 10, such as playback commands (e.g., pause, instant-replay, etc.). In addition, in certain embodiments, the user interface 20 can be used to communicate at least one variable parameter to the system controller 70, such as the identity of the user, which can be used by the system controller 70 to select an operational state for the storage drive 60. The user interface 20 can comprise a remote control keypad device, or a keypad wired directly to the video data storage system 10. Persons skilled in the art are able to select an appropriate communication technology for the user interface 20 in accordance with the present invention.

In one embodiment of the present invention, the video input interface 30 receives an external video data stream 32 from a video data service provider that supplies video programming to multiple users. Examples of such video data service providers include, but are not limited to, cable television systems and satellite systems. Alternatively, the external video data stream 32 can be received from UHF or VHF broadcast signals using an antenna.

The video input interface 30 is configured to respond to the external video data stream 32 by generating streaming data segments with a format which is compatible with the other components of the video data storage system 10. For example, to provide compatibility of the video data storage system 10 with an analog-formatted external video data stream 32, the video input interface 30 of one embodiment comprises an MPEG (Motion Pictures Experts Group) encoder, which generates compressed digitally-formatted streaming data segments in response to the analog-formatted external video data stream 32, and communicates the compressed digitally-formatted streaming data segments to the system controller 70. Furthermore, for particular embodiments that are compatible with an encrypted external video data stream 32 (e.g., video data streams from premium cable channels), the video input interface 30 comprises a decrypter. Alternatively, in other embodiments of the present invention, the encoding and decrypting features described above may instead be performed by the system controller 70, or by some other device upstream of the video data storage system 10. Persons skilled in the art are able to provide a video input interface 30 that receives and appropriately responds to the external video data stream 32 by generating streaming data segments in a manner in accordance with the present invention.

In certain embodiments of the present invention, the electronic program guide ("EPG") interface 40 can receive EPG information 42 which is transmitted to the system controller 70. In certain embodiments, the EPG information 42 is a database containing information regarding the broadcast schedules for various video program segments from various broadcast channels. This information is typically expressed in the form of a program grid with columns denoting the time periods, and with separate rows for each of the available broadcast channels. Each cell of the program grid contains information regarding a video program segment such as the title, genre of the program, principal actors, director, and brief synopsis. In one embodiment, the EPG information 42 is generated by a separate source from that of the external video data stream 32, and the EPG interface 40 is a separate interface (e.g., a phone line connection interface) from the video input interface 30. Alternatively, in other embodiments of the present invention where the EPG information 42 is generated by the same source as that of the external video data stream 32 and transmitted along with the external video data stream 32, the EPG interface 40 is part of the video input interface 30. Typically, in order to enable a user to utilize the EPG information 42, the video data storage system 10 displays the program grid directly on the display device 52 being viewed by the user. The user may then provide appropriate user input 22 to the system controller 70 via the user interface 20. The system controller 70 then uses the EPG information 42 to select the external video data stream 32 for the video program segment in response to the user input 22. In addition, the EPG information 42 can provide at least one variable parameter, such as the genre of the program currently displayed to the user, which can be used by the system controller 70 to select an operational state for the storage drive 60. Persons skilled in the art are able to select an appropriate configuration of the EPG interface 40 and to select the method of communicating the EPG information 42 to both the user and the system controller 70 compatible with the present invention.

The video output interface 50 is coupled to the system controller 70 and to a display device 52, which in certain embodiments of the present invention is a television. In response to data segments received from the system controller 70, the video output interface 50 generates a video data stream that is compatible with the display device 52. In this way, the system controller 70 can display to the user video program segments and graphical-user interfaces with EPG information, or other system information. Persons skilled in the art are able to select an appropriate configuration of the video output interface 50 compatible with the present invention.

The storage drive 60 is coupled to the system controller 70 and provides storage for streaming video data segments and various system information. In certain embodiments of the present invention, the storage drive 60 is compatible with a version of the ATA (AT-attachment) standard, such as IDE (Integrated Drive Electronics). In other embodiments, the storage drive 60 is compatible with the SCSI (Small Computer System Interface) standard. In still other embodiments, the storage drive 60 is compatible with the IEEE 1394 standard, which is described in the "IEEE Std 1394-1995 IEEE Standard for a High Performance Serial Bus," Aug. 30, 1996, which is incorporated by reference herein. Alternatively, the storage drive 60 can be a writable digital video disk (DVD) drive, or another technology that provides writable non-volatile storage.

The storage drive 60 is adapted to operate in a selected operational state of a plurality of operational states, with the operational state of the storage drive 60 selected by the system controller 70. When operating in an operational state, the storage drive 60 is operating at a corresponding performance level, which is typically characterized by a seek time corresponding to the speed at which the read/write head moves across the surface of the storage drive 60. Shorter seek times correspond to larger data access bandwidths for the storage drive 60. For example, a storage drive 60 compatible with the present invention may be operated in a continuum of operational states, with a continuum of seek times and a corresponding continuum of data access bandwidths.

While the storage drive 60 is operating in a selected operational state, the acceleration and movement of the internal actuator mechanism which moves the read/write head generates a corresponding level of acoustic noise. An operational state that corresponds to an increased performance level (i.e., a shorter seek time or an increased data access bandwidth) of the storage drive 60 also corresponds to an increased acoustic noise level of the storage drive 60. The acoustic noise level generated by the storage drive 60 can then be controlled by selecting an appropriate operational state of the storage drive 60. However, reductions of the acoustic noise level are made at the expense of a reduction of the data access bandwidth of the storage drive 60.

The system controller 70 of certain embodiments is in control of the various operations of the video data storage system 10, as well as what is displayed to the user at any given time. In response to user input 22 and EPG information 42, the system controller 70 can select which video data segments to record, and can route the video data segments to the storage drive 60. In embodiments in which the storage drive 60 is an IDE disk drive, the system controller 70 maintains a directory of the physical locations of the various data segments stored on the disk drive 60. Typically, this information is in the form of a file allocation table that contains a list of file names and the linked clusters for each file name. In other embodiments, the system controller 70 instead maintains a directory of logical locations that the disk drive 60 translates into physical locations. In response to user input 22 and EPG information 42, the system controller 70 also can select which video data segments to play back from the storage drive 60, and can route the appropriate video data segments from the storage drive 60 to the video output interface 50.

Figure 2:
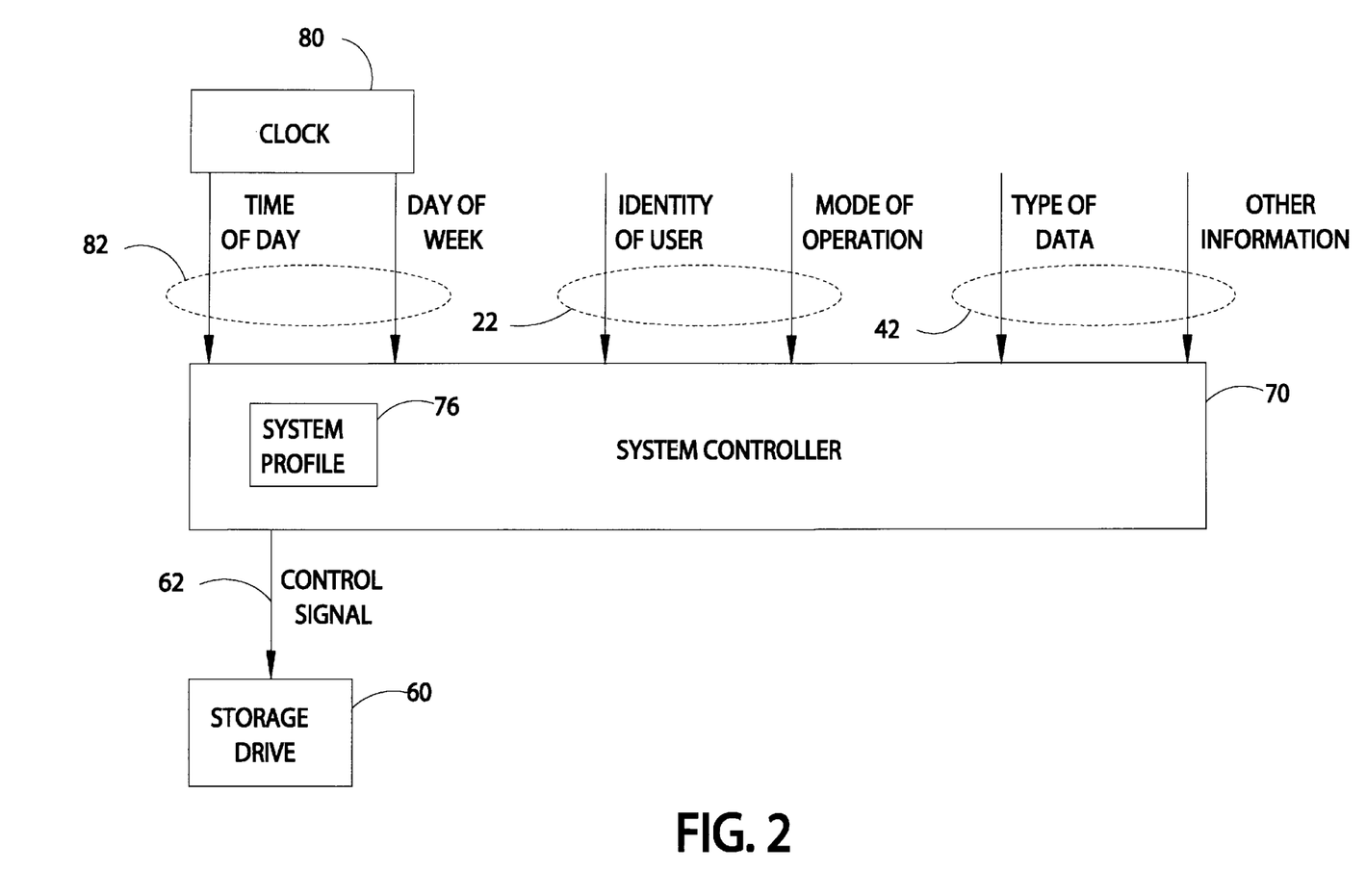
FIG. 2 schematically illustrates a system controller in accordance with an embodiment of the present invention.

FIG. 2 schematically illustrates a system controller 70 receiving at least one variable parameter in accordance with an embodiment of the present invention. The system controller 70 is coupled to a clock 80 from which it can receive time information 82 which can provide at least one variable parameter such as time of day or day of week information. In other embodiments, the clock 80 is a component of the system controller 70. In addition, the system controller 70 can receive user input 22 or EPG information 42. User input 22 can provide at least one variable parameter such as the identity of the user or a user-selected mode of operation. Similarly, EPG information 42 can provide the system controller 70 with at least one variable parameter such as the type of data being accessed (e.g., genre of a digitized video program), or other information regarding the scheduled video programming. The system controller 70 also transmits a control signal 62 to the storage drive 60, wherein the control signal 62 specifies the operational state of the storage drive 60 selected by the system controller 70.

The system controller 70 includes a system profile 76 which, in one embodiment, is a look-up table relating the various variable parameters to the plurality of operational states of the storage drive 60. Values of the variable parameters can then be used by the system controller 70 as an index to the system profile 76 to select an appropriate operational state for the storage drive 60.

Figure 3:
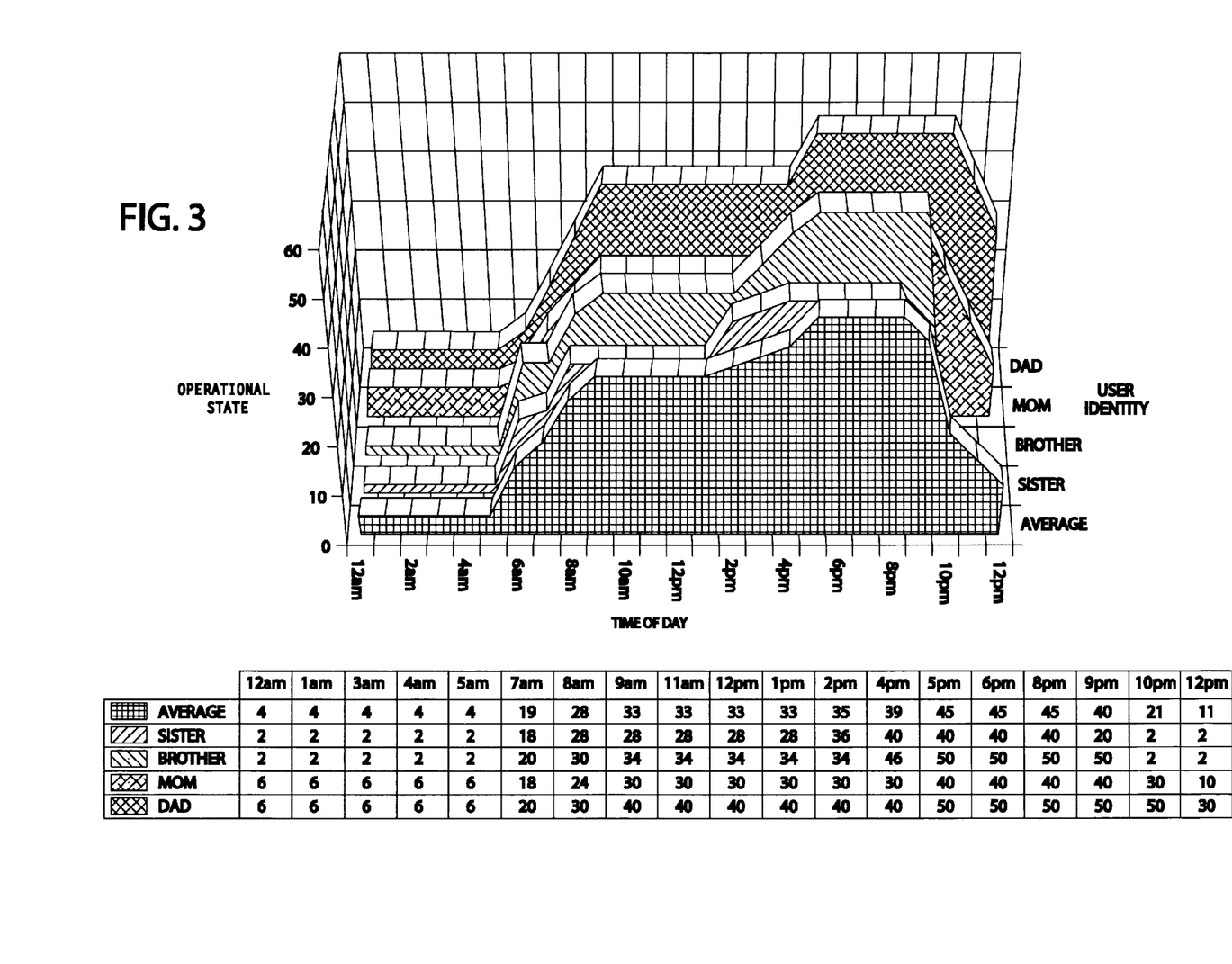
FIG. 3 schematically illustrates one embodiment of the system profile as an example of the dependency of the operational states of the storage drive on the various variable parameters.

FIG. 3 schematically illustrates one embodiment of the system profile 76 as an example of the dependency of the operational states of the storage drive 60 on the various variable parameters. FIG. 3 illustrates the dependency of the selected operational state for the storage drive 60 on the variable parameters of the identity of the user and the time of day for a household video data storage system (e.g., a personal video recorder). The operational states are labeled by numbers from 0 to 60, with larger numbers corresponding to larger acoustic noise levels, larger data access bandwidths, and shorter seek times. Note that other sets of variable parameters in alternative system profiles 76 are compatible with the present invention. As illustrated in FIG. 3, the identity of the user can be either Father, Mother, Brother, or Sister. Selected operational states are provided for each of the possible users during each time of day, as well as for no user or an unspecified user, for which the operational states are determined by the average of the operational states for the known users at each time of day. In this embodiment, the identity of the user and the time of day serve as an index to autonomously select an operational state of the storage device 60.

Focussing on the profile corresponding to Father as an example, from 12 a.m. to 5 a.m., the selected operational state is specified to be at level 6, which corresponds to a relatively quiet operation of the video data storage system 10. Thus, if the video data storage system 10 performs any data access operations from the storage drive 60 at these hours while Father is specified as the user, the data access operations will be performed at the relatively quiet operational state level 6. One reason for such quiet operational state levels at these hours is to maintain the relative quietness of the household while nearly everyone is asleep.

During the hours from 5 a.m. to 12 a.m., data access operations are performed at operational states with higher data access bandwidths and higher acoustic noise levels (e.g., levels 20 to 50). Besides reflecting the general noise level in the household during these hours, the selected operational states also reflect the personal preference of Father with regard to acoustic noise from the video data storage system 60 during these hours. Similarly, the profiles corresponding to Mother, Brother, and Sister reflect both the general noise level in the household, as well as the personal preferences of each user during the course of the day.

In some circumstances, the video data storage system 60 is programmed to perform data access operations when there are no users using the video data storage system 60. In one embodiment, when there are no users, the system controller 70 utilizes the average of all known users at the appropriate hour of the day. For example, if the video data storage system 60 is programmed to record an incoming video program during the hour from 8 p.m. to 9 p.m., but no one is using the video data storage system 60 at that time, the system controller 70 utilizes the operational state of level 45, which is the average of the operational states of the four known users at that hour. Other embodiments utilizing other methods of selecting the appropriate operational level with no users are also compatible with the present invention.

The system profile 76 can be entered into the system controller 70 directly by a user. Responding to prompts presented to the user by a graphical-user interface, the user can select appropriate operational states to represent his or her personal preferences regarding the acoustic noise level of the storage drive 60 for various times of the day. Alternatively, the appropriate operational states can be "learned" by the system controller 70 while the system controller 70 is in a manual mode of operation. The system controller 70 can track the operational levels selected by a particular user in association with a variable parameter, thereby obtaining information to develop the system profile 76. In either situation, once a profile is defined for a user, the operational state can be autonomously selected by the system controller 70.

The system profile 76 can also contain information regarding the dependency of the selected operational state of the storage device 60 on other variable parameters (e.g., day of the week, mode of operation, or type of data being accessed). For example, when performing data access operations while a user is viewing a program in a "western action" genre, the storage drive 60 can generate more acoustic noise without disturbing the user than if the program is in a "romantic comedy" genre. Similarly, if the type of data being accessed is processor information data, the storage drive 60 can generate more acoustic noise without disturbing the user than if the data is digitized video data to be viewed by the user. If the data storage system 10 is in a manual mode of operation, then some or all of the variable parameters may be ignored, and the operational state selection may be based in whole or in part on user input 22.

In some circumstances, the storage drive 60 in the operational state selected by the system controller 70 may operate at an insufficient performance level to perform all the required data access operations without some loss of data. In these circumstances, the system controller 70 can override the operational state selected using the system profile 76 to temporarily increase the performance level of the storage drive 60 (and increase the corresponding acoustic noise level) to ensure no loss of data. Alternatively, the status of the data buffers of the data storage system 60 can be monitored and serve as an additional variable parameter which the system controller 70 utilizes to select an appropriate operational state of the storage drive 60 to prevent input data buffer overflow or output data buffer underflow from being caused by insufficient data transfer rates.

While the embodiment described above has been in the context of a consumer audiovisual recording and playback device (i.e., a personal video recorder), the present invention is also compatible with other data storage systems such as a network server. Persons skilled in the art recognize that the present invention can be applied to numerous other data storage systems which utilize a storage device adapted to operate in a selected operational state of a plurality of operational states.

Figure 4:
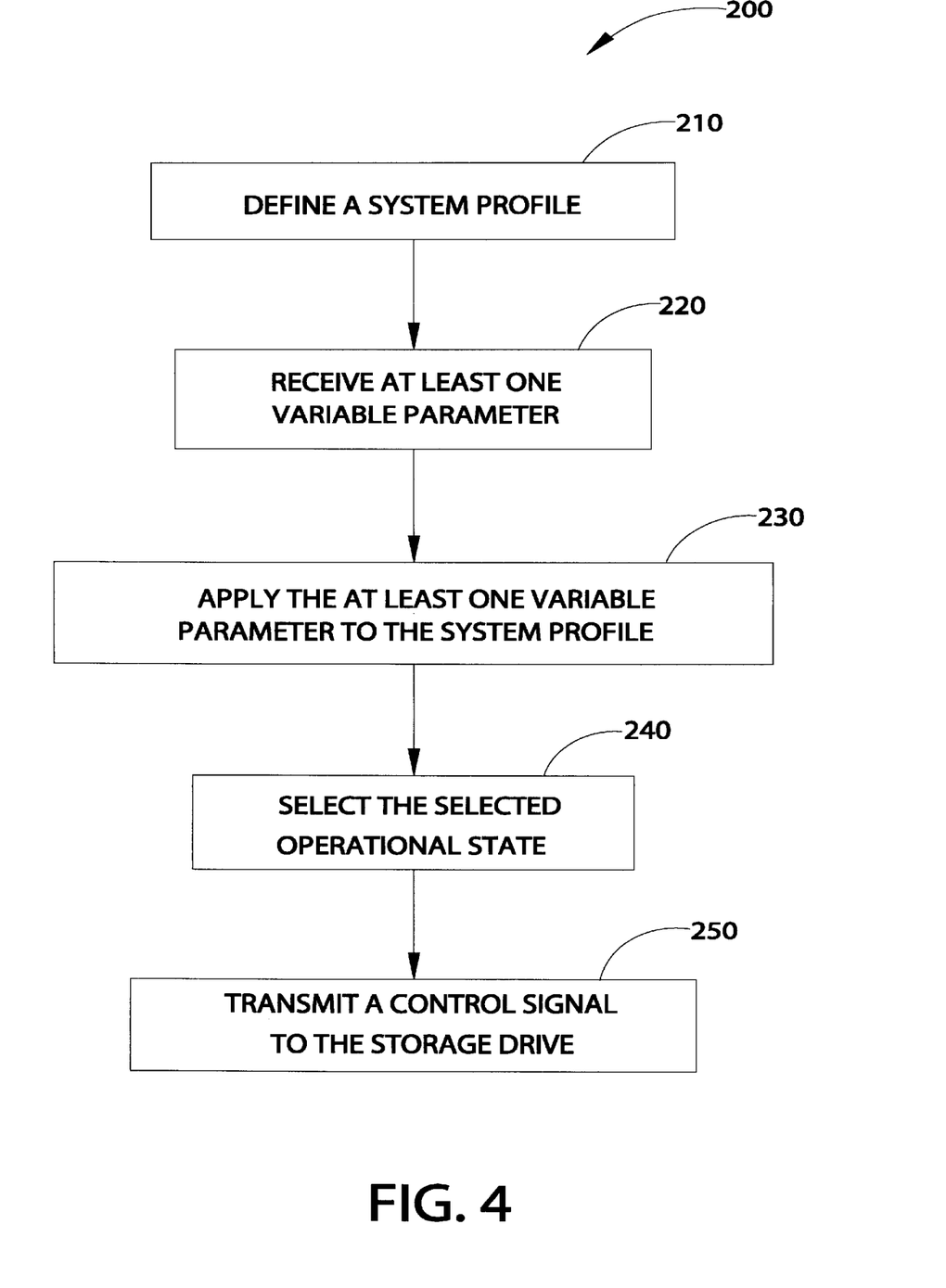
FIG. 4 is a flowchart which illustrates one embodiment of a method for controlling the acoustic noise generated by a storage drive of a data storage system.

FIG. 4 is a flowchart which illustrates one embodiment of a method 200 for controlling the acoustic noise generated by a storage drive 60 of a video data storage system 10. As described above, the storage drive 60 is adapted to operate in a selected operational state of a plurality of operational states, each operational state generating a corresponding acoustic noise level and operating at a corresponding performance level. The method 200 illustrated in FIG. 4 controls the acoustic noise and performance level of the storage drive 60 in response to at least one variable parameter. The following discussion is made in reference to the embodiments of the video data storage system 10 schematically illustrated in FIGS. 1, 2, and 3.

As shown in FIG. 4, the method 200 comprises a procedure block 210 which comprises defining a system profile 76, the system profile 76 relating the plurality of operational states of the storage drive 60 to at least one variable parameter. As described above, in certain embodiments, the system profile 76 can be defined directly by a user responding to prompts presented by a graphical-user interface, the user selecting appropriate operational states to represent his or her personal preferences regarding the acoustic noise level of the storage drive 60 for various values of the variable parameter (e.g., time of day). Alternatively, in other embodiments, the system profile 76 can be "learned" by tracking the operational levels selected by a particular user in association with various values of the variable parameter. In certain embodiments, the system profile 76 can include appropriate operational states for a null value of at least one variable parameter. For example, for the system profile 76 illustrated in FIG. 3, where no user is identified, the system profile 76 defines the selected operational state as the average of the operational states of all known users at the appropriate hour of the day.

The method 200 further comprises a procedure block 220 which comprises receiving at least one variable parameter. As described above, in certain embodiments, the at least one variable parameter is received from one or more of the following: the user input 22, the EPG information 42, or the time information 82 from the clock 80. In addition, in certain embodiments, the at least one variable parameter can have a null value, e.g., where no user is identified.

The method 200 further comprises a procedure block 230 which comprises applying the at least one variable parameter to the system profile 76. As described above, in certain embodiments, the system profile 76 is a look-up table which relates the various variable parameters to the plurality of operational states of the storage drive 60. The at least one variable parameter can then be applied to the system profile 76 as an index.

The method 200 further comprises a procedure block 240 which comprises selecting the selected operational state from the plurality of operational states in response to the at least one variable parameter. As described above, in certain embodiments, using the at least one variable parameter as an index to the system profile 76 selects an appropriate operational state for the storage drive 60. For example, using the system profile 76 illustrated in FIG. 3, when the user is identified as Father, and the time of day is 1 p.m., the selected operational state is specified to be at level 40.

The method 200 further comprises a procedure block 250 which comprises transmitting a control signal to the storage drive 60. The control signal corresponds to the selected operational state, thereby controlling the acoustic noise and performance level of the storage drive 60 in response to the at least one variable parameter.

What is claimed is:

1. A data storage system comprising:
    a storage drive adapted to operate in a selected operational state of a plurality of operational states, each operational state generating a corresponding acoustic noise level and operating at a corresponding performance level; and
    a system controller coupled to the storage drive, the system controller including a system profile, the system controller adapted to:
        (a) receive at least one variable parameter;
        (b) use the at least one variable parameter as an index to the system profile to autonomously select one of the plurality of operational states as the selected operational state; and
        (c) transmit a control signal to the storage drive, the control signal corresponding to the selected operational state and causing the storage drive to enter the selected operational state, thereby controlling the acoustic noise and the performance level of the storage drive in response to the at least one variable parameter.

2. The data storage system of claim 1, wherein an operational state that corresponds to an increased performance level of the storage drive also corresponds to an increased acoustic noise level of the storage drive.

3. The data storage system of claim 1, wherein the at least one variable parameter includes time information, and wherein the system profile associates a first operational state with a first range of times in each day and wherein the system profile associates a second operational state with a second range of times in each day.

4. The data storage system of claim 3, wherein the system controller is coupled to a clock which provides the time information.

5. The data storage system of claim 3, wherein the at least one variable parameter further includes a type of data being accessed.

6. The data storage system of claim 5, wherein the type of data being accessed comprises a genre of a video program represented by digitized video data.

7. The data storage system of claim 6, wherein the system controller is coupled to an electronic program guide interface which provides the genre of the video program.

8. The data storage system of claim 5, wherein the type of data being accessed comprises at least one of processor information data and digitized video data.

9. The data storage system of claim 5, wherein the at least one variable parameter further includes an identity of a user.

10. The data storage system of claim 9, wherein the system controller is coupled to a user interface which provides the identity of the user.

11. The data storage system of claim 3, wherein the at least one variable parameter further includes an identity of a user.

12. The data storage system of claim 11, wherein the system controller is coupled to a user interface which provides the identity of the user.

13. The data storage system of claim 1, wherein the at least one variable parameter includes an identity of a user, wherein the system profile associates a first operational state with an identity of a first known user, and wherein the system profile associates a second operational state with an identity of a second known user.

14. The data storage system of claim 13, wherein the system profile further associates an average operational state with an unknown or unspecified user, the average operational state representing an average of the operational states for all known users.

15. The data storage system of claim 1, wherein the at least one variable parameter includes a type of data being accessed, wherein the system profile associates a first operational state with a first type of data, and wherein the system profile associates a second operational state with a second type of data.

16. The data storage system of claim 15, wherein the type of data being accessed comprises a genre of a video program represented by digitized video data.

17. The data storage system of claim 15, wherein the type of data being accessed comprises at least one of processor information data and digitized video data.

18. The data storage system of claim 15, wherein the at least one variable parameter further includes an identity of a user.

19. The data storage system of claim 1, wherein the at least one variable parameter includes a mode of operation, wherein the system profile associates a first operational state with a first mode of operation, and wherein the system profile associates a second operational state with a second mode of operation.

20. The data storage system of claim 19, wherein the mode of operation determines a seek time of a read/write head of the data storage drive, wherein in the first mode of operation, the read/write head of the data storage drive has a relatively fast seek time, and wherein in the second mode of operation, the read/write head of the data storage drive has a relatively slow seek time.

21. The data storage system of claim 1, wherein at least a portion of the acoustic noise level is generated by movement of a read/write head in seeking to data tracks of the storage drive, and wherein the acoustic noise level is reduced by reducing a rate at which the read/write head is moved when seeking to the data tracks.

22. The data storage system of claim 1, wherein the data storage system is a consumer audiovisual recording and playback device.

23. The data storage system of claim 1, wherein the data storage system is a network server.

24. The data storage system of claim 1, wherein the storage drive is a rotating disk drive.

25. The data storage system of claim 1, wherein the system profile is programmable.

26. The data storage system of claim 25, wherein the system profile is automatically programmed by the system controller by tracking operational states selected by at least one user in association with the at least one variable parameter when the system controller is in a manual mode of operation.

27. A method of controlling the acoustic noise generated by a storage drive of a data storage system, the storage drive being adapted to operate in a selected operational state of a plurality of operational states, each operational state generating a corresponding acoustic noise level and operating at a corresponding performance level, the method comprising:

defining a system profile, the system profile relating the plurality of operational states of the storage drive to at least one variable parameter;

receiving at least one variable parameter;

applying the at least one variable parameter to the system profile;

selecting the selected operational state from the plurality of operational states in response to the at least one variable parameter; and transmitting a control signal to the storage drive, the control signal corresponding to the selected operational state, thereby controlling the acoustic noise and performance level of the storage drive in response to the at least one variable parameter.

28. The method of claim 27, wherein an operational state that corresponds to an increased performance level of the storage drive also corresponds to an increased acoustic noise level of the storage drive.

29. The method of claim 27, wherein the at least one variable parameter includes time information, and wherein the system profile associates a first operational state with a first range of times in each day and wherein the system profile associates as second operational state with a second range of times in each day.

30. The method of claim 29, wherein the time information is provided by a clock.

31. The method of claim 29, wherein the at least one variable parameter further includes a type of data being accessed.

32. The method of claim 31, wherein the type of data being accessed comprises a genre of a video program represented by digitized video data.

33. The method of claim 32, wherein the genre of the video program is provided by an electronic program guide interface.

34. The method of claim 31, wherein the type of data being accessed comprises at least one of processor information data and digitized video data.

35. The method of claim 31, wherein the at least one variable parameter further includes an identity of a user.

36. The method of claim 35, wherein the identity of the user is provided by a user interface.

37. The method of claim 29, wherein the at least one variable parameter further includes an identity of a user.

38. The method of claim 37, wherein the identity of the user is provided by a user interface.

39. The method of claim 27, wherein the at least one variable parameter includes an identity of a user, wherein the system profile associates a first operational state with an identity of a first known user, and wherein the system profile associates a second operational state with an identity of a second known user.

40. The method of claim 39, wherein the system profile further associates an average operational state with an unknown or unspecified user, the average operational state representing an average of the operational states for all known users.

41. The method of claim 27, wherein the at least one variable parameter includes a type of data being accessed, wherein the system profile associates a first operational state with a first type of data, and wherein the system profile associates a second operational state with a second type of data.

42. The method of claim 41, wherein the type of data being accessed comprises a genre of a video program represented by digitized video data.

43. The method of claim 41, wherein the type of data being accessed comprises at least one of processor information data and digitized video data.

44. The method of claim 41, wherein the at least one variable parameter further includes an identity of a user.

45. The method of claim 27, wherein the at least one variable parameter includes a mode of operation, wherein the system profile associates a first operational state with a first mode of operation, and wherein the system profile associates a second operational state with a second mode of operation.

46. The method of claim 45, wherein the mode of operation determines a seek time of a read/write head of the storage drive, wherein in the first mode of operation, the read/write head of the storage drive has a relatively fast seek time, and wherein in the second mode of operation, the read/write head of the storage drive has a relatively slow seek time.

47. The method of claim 27, wherein at least a portion of the acoustic noise level is generated by movement of a read/write head in seeking to data tracks of the storage drive, and wherein the acoustic noise level is reduced by reducing a rate at which the read/write head is moved when seeking to the data tracks.

48. The method of claim 27, wherein the storage drive is a rotating disk drive.

49. The method of claim 27, wherein the system profile is programmed.

50. The method of claim 49, wherein the system profile is automatically programmed by tracking operational states selected by at least one user in association with the at least one variable parameter.

* * * * *